Sept. 25, 1928.
R. SALBADOR
1,685,683
SPECIAL SLIDING TRAP DOOR VALVE AND GAS METER PROTECTOR
Filed April 7, 1927   2 Sheets-Sheet 2
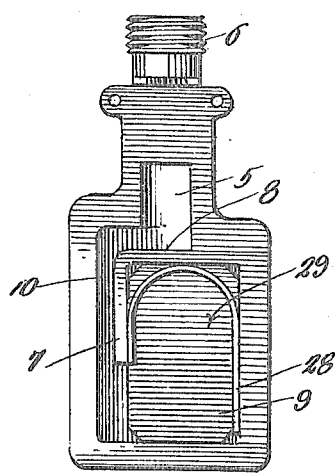
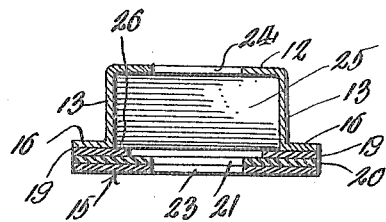
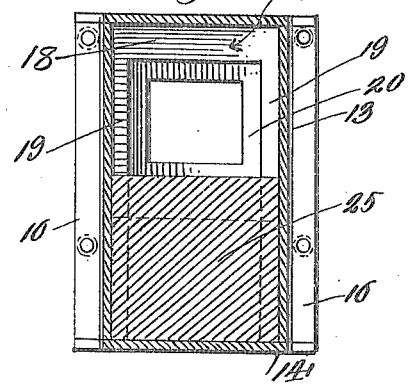
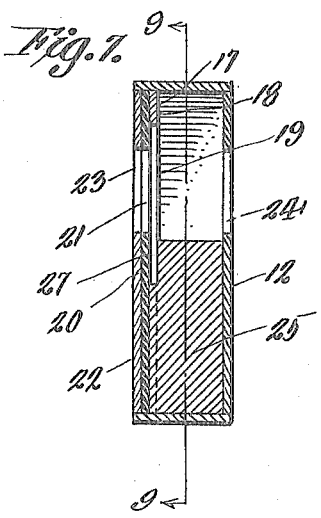
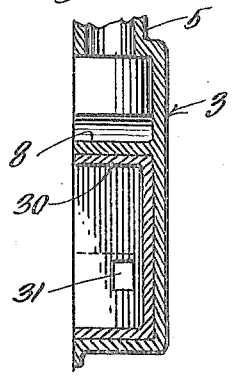
INVENTOR.
RAMON SALBADOR
BY
ATTORNEY Patented Sept. 25, 1928.

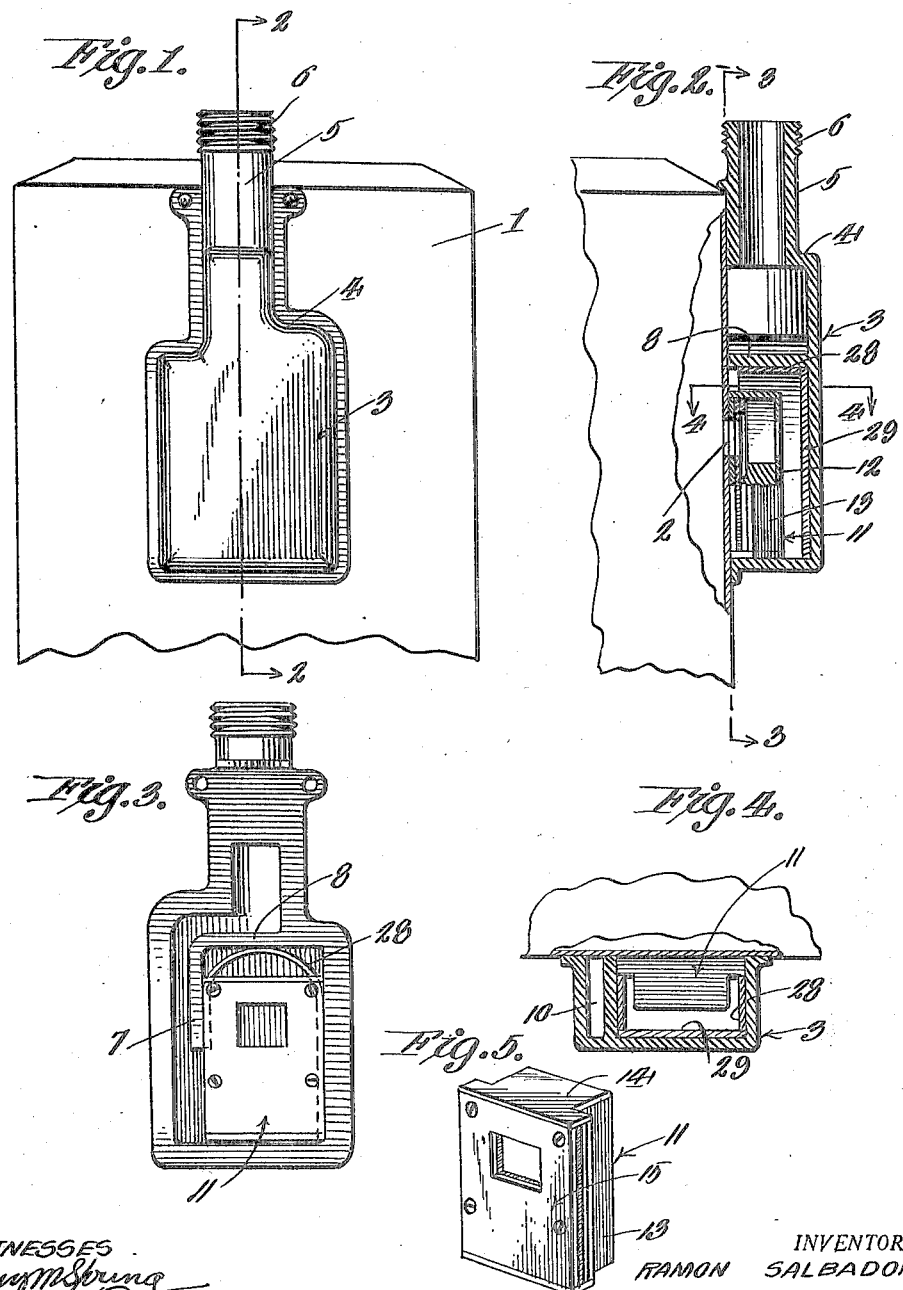

1,685,683

UNITED STATES PATENT OFFICE.

RAMON SALBADOR, OF NEW ORLEANS, LOUISIANA.

SPECIAL SLIDING TRAPDOOR VALVE AND GAS-METER PROTECTOR.

Application filed April 7, 1927. Serial No. 181,811.

This invention relates to a protective device designed particularly for use upon gas meters.

The primary object of this invention is to provide, in a manner as hereinafter set forth, a gas meter attachment designed to prevent tampering with the meter for the purpose of preventing the same from registering the quantity of gas passing therethrough.

As is well known, by inverting a gas meter of the type commonly in use at the present time, the gas flow controlling valves therein will be caused to so alter their positions that the quantity of gas passing through the meter will not affect the operation of these valves and consequently will not be indicated upon the recording apparatus of the meter. The present invention aims to frustrate such attempts to interfere with the registering mechanism of a meter, by the provision of a shut-off device designed to be placed either in the inlet pipe line or the outlet line as desired, and attached to the meter body, so that any extreme alteration or shifting of the meter from its normal upright position will cause a shutting-off of the gas flow, the flow only being restored upon replacing the meter in its proper upright position.

A further object of the present invention is to provide, in a manner as hereinafter set forth, a device of the above described character which is in itself invulnerable or proof against tampering so that unscrupulous persons can not in any manner interfere with its action.

A still further and final object of this invention is to provide a gas meter protector having only a single movable part and therefore of extreme simplicity, strong and durable construction, comparatively inexpensive to manufacture and easy to apply.

Numerous other objects and advantages of the present invention will become apparent as the description of the same proceeds and the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawings:

Figure 1 is a side elevation of the upper portion of a gas meter showing the device embodying this invention applied thereto.

Figure 2 is a vertical longitudinal section taken substantially upon the line 2—2 of Figure 1.

Figure 3 is a view of the inner face of the device embodying this invention which face is secured against the side wall of the meter.

Figure 4 is a transverse section taken upon the line 4—4 of Figure 2.

Figure 5 is a detailed perspective view of the valve block box removed from its housing.

Figure 6 is a view of the inner face of the casing of the device with the valve block box removed therefrom.

Figure 7 is a central longitudinal section through the valve block box.

Figure 8 is a transverse section of the valve block box.

Figure 9 is a longitudinal section through the valve block box taken upon the line 9—9 of Figure 7.

Figure 10 is a longitudinal section through the valve block box casing for the employment of a drill proof housing for the casing.

Referring now to the drawings in detail wherein like numerals of reference indicate corresponding parts throughout the several views, the figure 1 indicates the upper portion of a conventionally shown gas meter, looking at one side of the same, the usual opening 2 through the side wall of the meter being shown in Figure 2. As is well known, one of the pipes connecting to the meter communicates with the interior thereof through this opening.

The device embodying the present invention is designed to be secured against the side wall of the meter, at either the inlet or the outlet side, to overlie the opening 2, for the purpose hereinafter set forth. The application of the device will be described, for the sake of convenience, as applied to the inlet side of the meter body although it is of course to be understood that the same can be used upon the outlet side with the same results.

The meter protector comprises an inlet or outlet fitting in the form of a casing body indicated generally by the numeral 3, which body has its inner face open as is clearly shown in Figure 3 and has leading from the top wall 4 the neck 5 which terminates at its upper end in the threaded nipple 6. The interior of the casing 3 has formed in its upper half and adjacent one side wall thereof the partition wall 7 which extends across the top of the casing in close proximity to the top wall 4 as indicated at 8, setting up the chamber 9 and the passage 10 leading from the lower portion thereof to and opening into the neck 5. As will be readily understood from the showing of Figures 1 and 2, the casing 3 is secured in a leak-proof manner with its open face against the side wall of the meter and covering the outlet opening 2 in such manner that the opening leads directly into the upper portion of the chamber 9.

Positioned in the chamber 9 is a sliding valve block box indicated as a whole by the numeral 11, which box comprises the outer wall 12, the side walls 13, end walls 14 and an inner removable wall section indicated generally by the numeral 15. The side walls of the box have the laterally directed flanges 16 to which the inner wall structure 15 is secured.

The inner wall structure 15 comprises an inner substantially U-shaped plate 17, the cross or yoke portion 18 of which extends across the top of the box while the legs 19, which are of greater width than the flanges 16 rest against the faces of the flanges and project beyond the inner edges thereof as is clearly shown in Figure 8. A leather plate 20 overlies the plate 17 and has an aperture 21 formed through the upper central portion and overlying the leather plate 20 is an outer plate 22 in the central upper portion of which an aperture 23 is formed which registers with the aperture 21 of the leather plate.

Formed through the central upper portion of the outer wall 12 is an aperture 24 which is in alignment with the apertures 21 and 23, directly opposite and in the inner wall of the box.

Slidably disposed in the box, is a valve block body 25, along the inner face of each side edge of which a groove or recess 26 is formed to receive the projecting edges of the legs 19 of the inner plate 17 and across the top edge of this block a groove 27 is formed to receive the yoke portion 18 of the plate 17.

As is clearly shown in Figures 7 and 9, when the box 11 is in its normal vertical position, the block 25 will be located in the lower portion thereof thus leaving unobstructed the passage through the box and the apertures formed in the inner and outer walls thereof. The thickness of the valve block box is materially less than the thickness of the casing 3 and it will be seen that when the box is in position in the casing with the face of the inner wall 15 flush with the inner face of the casing, a space is left between the outer wall of the box and the casing which permits the gas to pass from the opening 2 of the meter wall through the openings of the box 11 and into and through the passage 10.

In order to maintain the valve block box in proper position, there is fitted in the chamber 9 the spring retaining member 28, one edge of which bears against the front wall of the casing while the other edge has the flanges 16 of the box resting thereon, thus spacing the box from the wall of the casing as described.

In order to prevent the formation of a hole in the front wall of the casing 3 and the insertion of a wire or other device thereinto to a position to prevent movement of the valve block 25 there is provided a plate of hardened steel, as indicated at 29, this plate overlying the inner face of the front wall of the casing and being held in position by the retaining member 28, as will be readily understood from the showing of Figures 2, 3 and 6.

In Figure 10 there is shown a slightly modified construction of the means employed for preventing tampering with the device by unscrupulous persons, which means comprises a shell formed of hardened steel, which is designed to be inserted in the chamber 9 and in which the valve block box is placed. This shell is indicated by the numeral 30 and, as shown in Figure 10 has that side wall lying adjacent the partition wall 7, provided, below the end of the partition, with an aperture 31 to permit passage of the gas through the device.

From the foregoing description, it will be readily understood that with the device embodying this invention positioned as described, no obstruction will be offered to the flow of gas through the meter but, upon the inversion of the meter the valve block body 25 will drop and effectively cut off the gas flow.

Having thus described my invention, what I claim is:

1. In combination, a gas meter casing provided with an opening, a fitting having a hollow body secured to the casing over the opening therein, a valve box element arranged within the body and provided with an opening registering with said first opening and an opening communicating with the interior of the body, and a valve body slidably arranged in said element and normally occupying a position below said openings and adapted to close said opening when the meter is shifted from its normal vertical position.

2. An inlet or outlet fitting for gas meter casings wherein the casing is provided with an inlet and an outlet opening, formed in the body thereof, comprising a casing body, a gas cut-off unit within said casing designed to overlie the adjacent opening and act to close the same upon the inversion of the meter, and means within the casing forming a barrier between certain faces of the unit and the casing to prevent the reaching of the valve unit through an opening drilled in the casing.

3. A fitting for gas meter casings having an inlet and an outlet opening in the body, comprising a casing body designed to be secured over one of said openings, a valve element box within the casing designed to be aligned with the adjacent opening of the meter casing, a sliding valve member within said box designed to close said passageway upon the invertion of the meter, and drill proof means within said casing forming a barrier between certain faces of the box and adjacent casing walls designed to prevent tampering with said member by the cutting of an opening through the protecting casing.

4. A fitting for gas meter casings having an inlet and outlet opening in the body thereof, comprising a casing body open at one side, an outlet opening through the top of said casing, a partition wall within the casing setting up a relatively narrow passageway along a portion of one side and across the top leading to said opening, said casing having its open side secured against the meter casing over one of said openings, a valve box within said casing at one side of said passageway, an opening through said valve box adapted to align with the adjacent meter casing opening, and a sliding valve within said box designed to close said opening to prevent the passage of gas through the casing when the casing is inverted, said box being of less thickness than the casing to permit gas to flow through the box to a space between the box and the casing and beneath said partition to said passageway.

5. A fitting for gas meter casings having an inlet and outlet opening in the body thereof, comprising a casing body open at one side, an outlet opening through the top of said casing, a partition wall within the casing setting up a relatively narrow passageway along a portion of one side and across the top leading to said opening, said casing having its open side secured against a meter casing over one of said openings, a valve box within said casing at one side of said passageway, an opening through said valve box adapted to align with the adjacent meter casing opening, and a sliding valve within said box designed to close said opening to prevent the passage of gas through the casing when the casing is inverted, said box being of less thickness than the casing to permit gas to flow through the box to a space between the box and the casing and beneath said partition to said passageway, and means within said casing for protecting certain faces of the valve box by the drilling of a hole through the casing to reach said valve box, substantially as and for the purpose described.

In testimony whereof I affix my signature.

RAMON SALBADOR.